Figure 1:
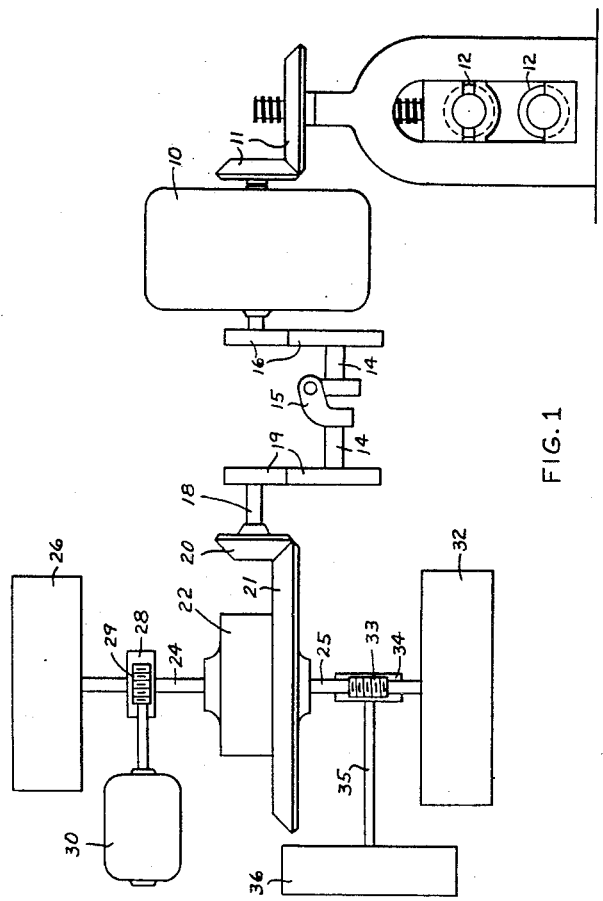

Aug. 14, 1951     C. A. SCHURR     2,564,284
PREPOSITIONING MOTOR CONTROL SYSTEM
Filed Jan. 11, 1949     3 Sheets-Sheet 1

Inventor
CHARLES ALLAN SCHURR
By
his Attorneys

Patented Aug. 14, 1951

2,564,284

UNITED STATES PATENT OFFICE 2,564,284

PREPOSITIONING MOTOR CONTROL SYSTEM

Charles Allan Schurr, Euclid, Ohio, assignor to The Electric Controller & Manufacturing Company, Cleveland, Ohio, a corporation of Ohio Application January 11, 1949, Serial No. 70,186

15 Claims. (Cl. 318—33)

This invention relates to a control system for an electric motor, and more particularly to a control system for automatically predetermining and controlling the number of revolutions to be made by the motor in each of a plurality of sequential operating periods. Although not limited to such use, the invention is described herein as applied to the control of a screw-down motor for a rolling mill.

In the operation of a rolling mill it is necessary to repeatedly vary the spacing of the rolls in reducing a bloom or ingot to a desired size or shape. In so doing the bloom or ingot is passed between the rolls at least once for each spacing. Between the passes, the spacing of the rolls is varied by the screw-down motor. Motor controllers, known as automatic preset screw-down controllers, have been developed which permit the entire rolling procedure to be pre-scheduled, thereby rendering the roll spacing for each pass uniform and proper and not a matter of choice by the operator. This pre-scheduling increases the accuracy of the final product rolled, reduces abuse of the mill, and results in a better product metallurgically.

Automatic preset screw-down controllers having differentially driven control elements such as described and claimed in Wright and Wilcox Patent No. 2,106,965 have been used extensively in the control of various types of rolling mills in several different metal-working industries. The speed and accuracy of these prior controllers have been adequate in nearly all cases. Recently, however, there has been a demand for higher speeds to reduce the time required for the rolls to reach their next position, particularly on return from the final to the first pass of a schedule. Material increases in speed above those previously considered suitable for all types of mills have heretofore resulted in a loss of accuracy because of the high inertia of the moving parts which rendered prior slow-down means inadequate. Attempts to incorporate adequate slow-down means for higher speeds into the prior controllers have heretofore not been successful.

The present invention is an improvement of the prior control system described in the Wright and Wilcox patent. In the patent the direction of screw-down motor rotation is determined by a polarized relay in accordance with the polarity of a unidirectional signal voltage derived from a rheostat selectively driven by the screw-down motor and a small set-up motor. In the present invention, a phase-responsive electronic balance detector circuit replaces the prior polarized relay and determines the direction of screw-down motor rotation in accordance with the phase relation between an alternating reference voltage of fixed phase and an alternating voltage the phase of which is selectively in phase of 180° out of phase with the reference voltage and derived from the motor-operated rheostat. In order to obtain adequate slow-down of the screw-down motor before a final stopping position is reached even though the screw-down motor attains a very high speed, a means is provided which interprets how closely the rolls are approaching a pre-scheduled stopping position. This means preferably comprises an electronic balance anticipator circuit responsive to the magnitude of the alternating signal voltage derived from the motor driven rheostat, the magnitude of the signal voltage being directly proportional to the number of motor revolutions required before the stopping position is reached. Similar balance detector and balance anticipator circuits are used also to control the set-up motor.

An object of this invention is to provide an improved motor control system for automatically predetermining and controlling the number of revolutions to be made by an electric motor in each of a plurality of sequential operating periods.

Another object is to provide an improved automatic preset screw-down controller.

Another object is to provide an improved automatic preset screw-down controller in which an electronic means responsive to a signal voltage derived from a rheostat driven by the screw-down motor controls the speed of movement and ultimate spacing of the mill rolls.

Another object is to provide means responsive to the relative phase position of an alternating reference voltage and an alternating signal voltage derived from a pre-positioned rheostat for determining the direction of rotation of a motor driving the rheostat.

Another object is to provide a means responsive to the magnitude of a signal voltage derived from a rheostat to control the speed of a motor driving the rheostat in accordance with the required amount of rotation of the motor as determined by the rheostat.

Another object is to provide means responsive to both the phase and magnitude of an alternating signal voltage derived from a motor driven rheostat for determining the direction of rotation, point of slow down, and point of stopping, of the motor driving the rheostat.

Another object is to provide an improved control system in which a pair of electronic tubes are responsive to the phase relation of a reference voltage and a signal voltage for controlling a motor.

Another object is to provide an improved control system in which an electronic tube responsive to the magnitude of a signal voltage derived from a motor operated rheostat controls the speed of the motor driving the rheostat.

Figure 2:
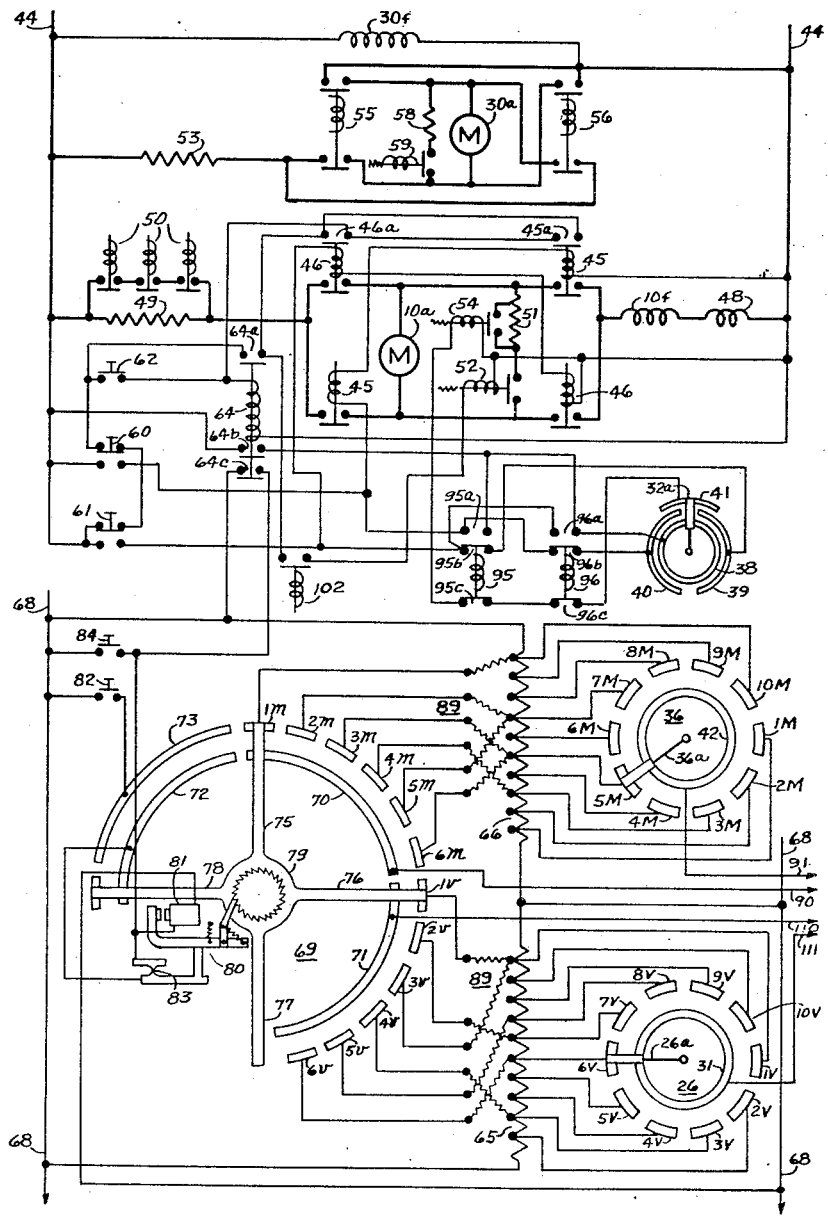
Figure 3:
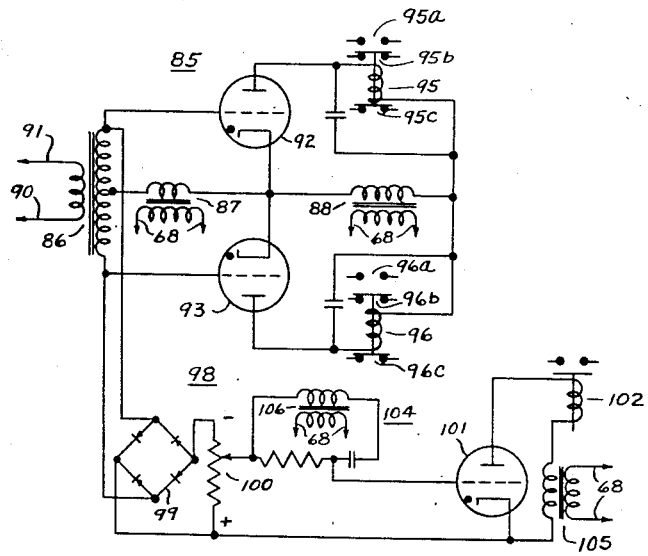
Figure 4:
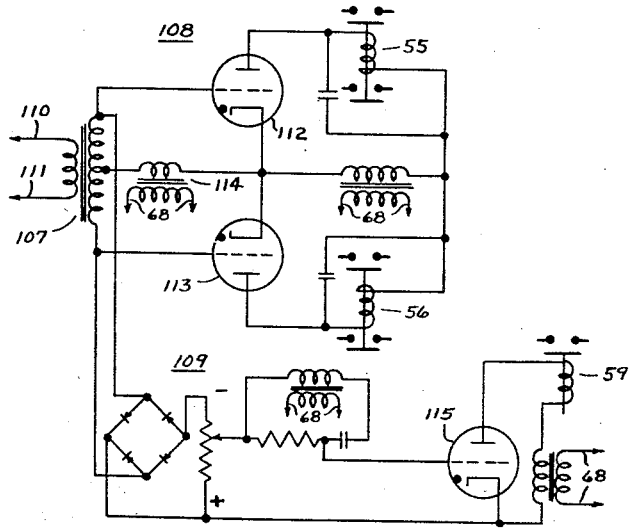

Other objects and advantages will become apparent from the following description wherein reference is made to the drawings, in which Fig. 1 is a schematic layout of a portion of the apparatus showing its relation to a screw-down motor, Fig. 2 is a wiring diagram of a portion of the control system, and Figs. 3 and 4 are wiring diagrams of the remainder of the control system.

In the wiring diagram of Figs. 2, 3, and 4, some of the switch contacts and their operating windings are shown in convenient locations in the circuit apart from each other and are also shown operatively associated with each other.

The apparatus of Fig. 1 is the same as that shown in the aforementioned Wright and Wilcox patent to which reference may be had for a complete description thereof, hence only a brief description is included herein. In Fig. 1, a screw-down motor 10 is suitably coupled as by gearing 11 to a screw-down mechanism associated with relatively movable rolls 12 for moving the rolls toward and away from each other. A driven shaft 14 interrupted by a suitable adjustable coupling 15 is driven by the motor 10 through suitable gearing 16. A pinion shaft 18 driven by the shaft 14 through gearing 19 carries a pinion 20 meshing with a ring gear 21 coupled to an automobile type differential 22 having output shafts 24 and 25. Rigidly secured at the outer end portion of the shaft 24 is an arm 26a (Fig. 2) of a vernier rheostat 26 and at an intermediate portion is a worm wheel 28 meshing with a worm 29 secured to the output shaft of a set-up or prepositioning motor 30. As shown in Fig. 2, the vernier rheostat 26 has circumferentially spaced contacts 1V through 10V and a contact ring 31, the ring and contacts being selectively bridged as the arm 26a rotates.

Rigidly secured at the outer end portion of the shaft 25 is an arm 32a (Fig. 2) of a cut-out or control device 32 and at an intermediate portion is a worm 33 meshing with a worm wheel 34 on a shaft 35 coupled to an arm 36a (Fig. 2) of a main rheostat 36. Although the cut-out 32 may be of any suitable type and may be cam operated, it is shown in Fig. 2 as a face plate type having a contact ring 38, a pair of circumferentially spaced segmental contacts 39 and 40, and a segmental contact 41 radially spaced from and extending slightly beyond both ends of a gap between the contacts 39 and 40, the ring and contacts being selectively bridged as the arm 32a rotates. The main rheostat 36 is similar to the vernier rheostat 26 and has circumferentially spaced contacts 1M through 10M and a contact ring 42, the ring and contacts being selectively bridged as the arm 32a rotates.

The ratio of the worm 29 and wheel 28 may be any suitable value, but for greatest accuracy preferably is relatively high, as for example, 35 to 1. The ratio of the worm 33 and wheel 34 must, however, be selected in accordance with the number of contacts on the main rheostat 36. In the disclosed embodiment a ratio of 10 to 1 is assumed. Thus, when the shafts 24 and 25 are rotating at the same speed, the arms 26a and 32a rotate at the same speed, and for each revolution of the arms 26a and 32a, the arm 36a turns $\frac{1}{10}$ of a revolution. Since the ten contacts 1M through 10M of the main rheostat are equally spaced circumferentially, the arm 36a travels a distance equal to that from the radial center line of one of the main rheostat contacts to the radial center line of an adjacent contact while the arms 26a and 32a are each making one complete revolution.

When the pinion 20 is driving the ring gear 21, the shaft 25 rotates but the shaft 24 does not since it is locked by the worm wheel 28 and worm 29. On the other hand, when the set-up motor 30 is operated to drive the shaft 24 and the pinion 20 is not rotating, the shaft 25 rotates at the same speed as the shaft 24 but in the opposite direction due to action of the differential 22.

Referring now more particularly to Fig. 2, the screw-down motor 10 which is shown as a direct current series machine having an armature winding 10a and a series field winding 10f is arranged to be selectively connected to a suitable direct current source 44 for driving the rolls 12 upwardly upon closure of a pair of electromagnetic up contactors 45 and for driving the rolls 12 downwardly upon closure of a pair of electromagnetic down contactors 46. One of the contactors 45 has auxiliary normally open contacts 45a and one of the contactors 46 has normally open auxiliary contacts 46a. An operating winding 48 of a suitable spring-applied, electromagnetically-released brake for the motor 10 may be connected in series with the motor 10. An acceleration controlling resistor 49 also in series with the motor 10 has portions arranged to be by-passed by suitable electromagnetic contactors 50, respectively, which may be controlled in a suitable and well-known manner.

Slow down of the motor 10 prior to stopping is effected by an armature shunt resistor 51 which is arranged to be connected across the armature 10a upon closure of an electromagnetic contactor 52, an electromagnetic contactor 54 also being provided to vary the effective value of the resistor 51. It is to be understood that upon closure of the contactor 52 one or more of the contactors 50 are caused to open by electrical interlocks (not shown).

The set-up motor 30 which may be fractional horsepower machine and which has an armature winding 30a and a shunt field winding 30f is arranged to be reversibly connected to the source 44 through a resistor 53 by selective operation of a double pole electromagnetic forward contactor 55 and a double pole electromagnetic reverse contactor 56. Slow down of the motor 30 prior to stopping is effected by an armature shunt resistor 58 arranged to be connected across the armature 30a by an electromagnetic contactor 59.

Manual operation of the screw-down motor 10 may be obtained by operation of an up push button 60 and a down push button 61 each having a pair of normally-open and a pair of normally-closed contacts. A normally open push button 62 initiates operation of the system during automatic operation by causing closure of an electromagnetic control relay 64 having normally open contacts 64a, 64b, 64c.

Suitable tapped resistors 65 and 66 forming part of the vernier rheostat 26 and the main rheostat 36, respectively, are connected across a source of alternating voltage represented by the supply lines 68. The vernier rheostat resistor 65 has ten equally spaced taps connected respectively to the contact segments 1V through 10V, and the main rheostat resistor 66 likewise has ten equally spaced taps connected respectively to the contact segments 1M through 10M. Other numbers of taps and contact segments may of course be used, but the number should preferably correspond to the ratio between the worm 33 and the worm wheel 34 as previously explained.

A selector device 69 of the stepping relay type has a plurality of uniformly circumferentially spaced contact segments 1m through 6m radially spaced from an elongated contact segment 70, a similar group of contact segments 1v through 6v radially spaced from an elongated segment 71, and a pair of radially spaced elongated segments 72 and 73. All of the contact segments of the selector 69 are co-axial.

A plurality of contact arms 75, 76, 77, and 78 extending from a hub 79 are driven by an electromagnetically operated ratchet and pawl device 80 in a well known manner. The operating winding 81 of the ratchet and pawl device 80 is controlled in a manner to be described. In the position shown, the arm 75 bridges the elongated segment 70 and the contact 1m and upon step-by-step clockwise movement of the hub 79 engages in succession the contacts 2m through 6m. Likewise the arm 76 is shown as bridging the elongated segment 71 and the contact 1v and upon step-by-step clockwise movement of the hub 79 engages in succession the contacts 2v through 6v. Upon initial movement of the hub 79 from the position shown, the arm 78 bridges the segments 72 and 73 and continues to do so upon further clockwise movement of the hub until the arms 75 and 76 have moved out of engagement with the contacts 6m and 6v, respectively. Further movement of the hub 79 results in the arm 78 controlling the connection between the elongated segment 70 and its associated contacts 1m through 6m, the arm 75 controlling the connection between the elongated segment 71 and the contacts 1v through 6v, and the arm 77 controlling the connection between the two elongated segments 72 and 73.

A push button 82 is provided for controlling the energization of the winding 81 through the contact segments 72 and 73 and make-and-break contacts 83 operated by the winding 81 to cause the hub 79 to rotate continously clockwise until one of the arms 75, 76, 77, or 78 bridges the contact segments 70 and 1m. A push button 84 is provided for advancing the hub 79 in a step-by-step manner, each operation of the button 84 causing the hub 79 to rotate one step.

Means are provided for selectively connecting the contact segments 1m through 6m to taps on the main rheostat resistor 66 and for selectively connecting the contact segments 1v through 6v to the taps on the vernier rheostat resistor 65. As shown, this means comprises a plurality of plug and flexible cord sets 89 but other circuit selecting means may be employed if desired.

Referring now more particularly to Fig. 3, a phase sensitive balance detector 85 associated with the main rheostat 36 comprises transformers 86, 87, and 88, the primary windings of the transformers 87 and 88 being supplied from the source 68 as indicated and the primary winding of the transformer 86 being supplied through the conductors 90 and 91 extending from the contact segment 70 (Fig. 2) of the selector 69 and from the ring 42 of the main rheostat 36, respectively. The transformer 88 supplies power to the plates of a pair of suitable gaseous discharge devices or tubes such as thyratrons 92 and 93, the plate-filament circuits of which are connected in series with operating windings of relays 95 and 96, respectively. The relay 95 has normally open contacts 95a and a pair of normally closed contacts 95b and 95c, and the relay 96 has normally open contacts 96a and a pair of normally closed contacts 96b and 96c. Since the transformer 88 feeds the plates of both tubes 92 and 93 in parallel, the voltages on the plates of both tubes are in the same phase.

The transformer 87 supplies the grids of both tubes 92 and 93, in series with opposite halves respectively, of the secondary winding of the transformer 86, with a "lock-out" voltage 180° out of phase with the plate voltages of the tubes 92 and 93. The magnitude of this lock-out voltage is sufficient to prevent either tube from conducting when no signal voltage is present at the primary of the transformer 86.

A balance anticipator 98 associated with the main rheostat 36 comprises a suitable rectifier 99 having its alternating current terminals connected across the secondary of the transformer 86 and its direct current terminals connected across a suitable potentiometer 100. The balance anticipator 98 also comprises a suitable gaseous discharge device or tube such as the thyratron 101, a slow-down relay 102, a suitable phase shifter 104, and a transformer 105. The transformer 105 supplies alternating current obtained from the source 68 to the filament-plate circuit of the tube 101 which also includes the operating winding of the relay 102.

The grid circuit of the tube 101 has a unidirectional and an alternating voltage supplied thereto. The unidirectional voltage is obtained from the potentiometer 100 as indicated so that the grid of the tube 101 is negative with respect to the cathode. The alternating voltage in the grid circuit is of small magnitude and functions to provide a more definite operation of the slow-down relay 102 and is obtained from a transformer 106 in the phase shifter 104.

The balance detector 85 and balance anticipator 98 operate as follows: Assuming an alternating signal voltage at the primary of the transformer 86 due to an unbalance of the main rheostat 36, the voltage at the secondary of the transformer 86 can be considered as two equal voltages from the center tap to opposite ends of the secondary winding, these voltages being 180° out of phase with each other. Since the respective halves of the secondary winding of the transformer 86 are in series with the grids of the tubes 92 and 93, the voltage across each half of the transformer 86 adds vectorially to the common lock-out voltage derived from the transformer 87. Depending upon the phase relation of the voltage at the transformer 86 with respect to the voltage of the source 68, the secondary voltage of one-half of the transformer 86 adds to the lock-out voltage to continue to prevent conduction of one of the tubes 92 and 93, whereas the secondary voltage of the other half of the transformer 86 is 180° out of phase with the lock-out voltage and is of sufficient magnitude to more than cancel the lock-out voltage and cause the other of the tubes 92 and 93 to conduct. This is true even though the voltage at the primary of the transformer 86 corresponds to the voltage between the adjacent segments 1M through 10M of the main rheostat 36. With only one of the tubes 92 and 93 conducting, half-wave rectified current flows through the one of the relays 95 and 96 associated with the tube that is conducting and no current flows through the other of the two relays 95 and 96. The relays 95 and 96 are arranged to control the direction of rotation of the motor 10 as will be described later.

If the phase of the voltage at the primary of the transformer 86 is reversed in a manner to be explained, the other of the two tubes 92 and 93 becomes conducting and the tube that was conducting blocks further flow of current. The balance detector 85 is thus sensitive to the phase of the input signal voltage relative to the phase of the common lock-out voltage. Pick-up of the relays 95 and 96 starts the motor 10 in such a direction as to reduce the signal voltage to zero.

Referring now to the operation of the balance anticipator 98, the magnitude of the direct voltage in the grid circuit of the tube 101 varies with that of the signal voltage at the primary of the transformer 86. The voltage from the positive end of the potentiometer 100 to the position of the intermediate adjusting tap thereof tends to prevent the tube 101 from conducting. Thus with a large alternating voltage at the primary of the transformer 86, corresponding to a displacement of several of the segments 1M through 10M between the arm 36a and a position of balance, and with the adjustable tap near the negative end of the potentiometer 100, the tube 101 does not conduct and the relay 102 remains deenergized. As the arm 36a approaches the balance segments, the signal voltage at the transformer 86 decreases in magnitude until the direct voltage in the grid circuit of the tube 101 permits conduction by the tube as a half-wave rectifier causing pick-up of the relay 102. If the adjustable tap of the potentiometer 100 is nearer to the positive end of the resistor, the tube 101 starts to conduct at a higher value of the signal voltage, and if at the positive end, the tube 101 conducts irrespective of the signal voltage. Hence by adjustment of the potentiometer 100, the relay 102 may be made to close at any desired number of segments from the balance segment. The alternating signal voltage at the transformer 86 is rectified by the rectifier 99 to eliminate the effect of phase reversal with different directions of motor rotation but with a fixed phase of plate voltage on the tube 101.

Associated with the vernier rheostat 26 (Fig. 2) is a balance detector 108 (Fig. 4) and a balance anticipator 109 corresponding to the balance detector 85 and the balance anticipator 98, respectively. The signal voltage at a transformer 107 for the balance detector 108 and the balance anticipator 109 is supplied through conductors 110 and 111 extending from the contact segment 71 (Fig. 2) of the selector 69 and from the ring 31 of the vernier rheostat 26, respectively. Since the balance detector 108 and the balance anticipator 109 are similar in structure and function to the detector and anticipator previously described, only differences will be pointed out.

Gaseous discharge devices or tubes such as thyratrons 112 and 113 of the balance detector 108 correspond to the tubes 92 and 93 and control the operation of the contactors 55 and 56, respectively, thereby to control the direction of operation of the motor 30 in accordance with the direction of movement of the arm 26a required to balance the rheostat 26. A transformer 114 corresponds to the transformer 87 of the balance detector 85. A gaseous discharge device or tube such as a thyratron 115 of the balance anticipator 109 corresponds to the tube 101 and controls the operation of the contactor 59 thereby to effect slow-down of the motor 30 in accordance with the number of the segments 1V through 10V between the arm 26a and a position of balance as will be described.

With the exception of the operation of the balance detectors 85 and 108 and the balance anticipators 98 and 109, the operation of the control system of Figs. 2, 3, and 4 is apparent from the foregoing description and the aforementioned Wright and Wilcox patent. Hence only a brief description of overall operation is included herein.

For the purpose of explaining the operation, assume that the movement of the main rheostat arm 36a from the center of one contact to the center of an adjacent contact corresponds to one inch of roll travel, that the rolls 12 are in contact with each other when the arm 36a is in the center of the contact 1M, and that the movement of the vernier rheostat arm 26a from the center of one contact to the center of an adjacent contact moves the arm 36a one-tenth of the distance between the center lines of adjacent ones of its associated contacts or a distance corresponding to one-tenth inch of roll travel.

The function of the set-up motor 30 is to preposition the arm 36a by moving it clockwise or counter-clockwise a predetermined amount from the center line of the contact on which the arm 36a last stopped so that the total travel of the arm 36a in moving to the center-line of the next contact on which it has to stop, upon the next operation of the motor 10, corresponds to the inches and fraction thereof which one of the rolls 12 must travel to give the pre-selected roll separation for the next pass.

If it is assumed that the connections from the contacts 1m through 6m and 1v through 6v are plugged in to taps on the resistor 66 and 65, respectively, as shown in Fig. 2, the following schedule of roll separation results by automatic operation:

| Pass | Roll Separation | Roll Travel |
| --- | --- | --- |
|  | Inches | Inches |
| 1 | 9.0 | 4.5 up. |
| 2 | 6.4 | 2.6 down. |
| 3 | 4.0 | 2.4 down. |
| 4 | 2.8 | 1.2 down. |
| 5 | 6.3 | 3.5 up. |
| 6 | 4.5 | 1.8 down. |

It is further assumed that the apparatus is as shown in Fig. 2 and Fig. 3 with the rheostat arms 26a and 36a and the cut-out arm 32a in the positions shown, this representing the condition of the apparatus after the screw-down motor 10 stopped at pass No. 6 and after the selector 69 moved to the position for pass No. 1. With power supplied to the supply lines 44, the shunt field 30f is energized, and, with power supplied to the supply lines 68, an alternating voltage exists across each of the resistors 65 and 66.

The voltage drop across the resistor 65 from the contacts 6V to 1V causes a signal voltage to appear at the transformer 107 (Fig. 4) through the conductors 110 and 111. This signal voltage is of such phase relation that the tube 112 conducts to energize the contactor 55 which responds to connect the set-up motor 30 for forward operation. The motor 30 then drives the arm 26a at full speed clockwise toward the contact 1V. Before the arm 26a reaches the contact 1V, as for example when the arm 26a reaches the contact 9V, the magnitude of the signal voltage at the transformer 107 has decreased to a value permitting the tube 115 to conduct thereby to energize the contactor 59 which responds to complete the armature shunt circuit for the motor 30 through the resistor 58. The motor 30 then slows down and, when the arm 26a reaches the contact IV, the tube 112 ceases to conduct, the contactor 55 opens, and the motor 30 stops. The set-up motor has driven the cut-out arm 32a counter-clockwise one-half of a revolution from the position shown and has driven the main rheostat arm 36a in a clockwise direction over a portion of the contact 5M corresponding to 0.5 inch of roll travel. The relay 95 is energized and its contacts 95a closed because the signal voltage appearing across the resistor 66 from the contact 5M to the contact 10M is of such phase relation that the tube 92 conducts. The apparatus is now pre-set for the operation of the screw-down motor 10 and the operator can now separate the rolls for the first pass.

Closure of the push button 62 causes the relay 64 to close its contacts 64a, 64b, and 64c. Closure of the contacts 64b completes a circuit from the left-hand supply line 44 through the contacts 64b, the now closed contacts 95a, and the two operating windings of the up contactors 45 to the other supply line 44. The contactors 45 thereupon close and cause the screw-down motor to drive the top roll 12 upwardly and to drive the arm 36a clockwise. Closure of the contacts 64a and the contacts 45a complete a holding circuit around the push button 62 which may now be released. Closure of the contacts 64c energizes the winding 81 of the ratchet and pawl device 80 from the source 68, but no movement of the hub 79 occurs until the winding 81 is subsequently deenergized by opening of the contacts 64c.

While the arm 36a of the main rheostat is rotating in the clockwise direction, the cut-out arm 32a is also rotating in the clockwise direction and makes one revolution while the arm 36a is moving a distance equal to the distance between centerlines of adjacent contacts in its path of travel.

After the contactors 45 have closed, the contactors 50 are caused to close in timed succession in any well known manner to permit acceleration of the motor 10 to its maximum speed.

As the arm 36a moves toward the balance contact 10M, the magnitude of the signal voltage at the transformer 86 decreases. When the arm 36a reaches the contact 9M, for example, this signal voltage preferably has decreased to a value permitting conduction of the tube 101 and operation of the slow-down relay 102. Closure of the contacts of the relay 102 completes a circuit through the contacts 64a to the operating winding of the contactor 52 which thereupon closes its contacts to complete the armature shunt circuit for the motor 10 through all of the resistor 51 and opens an interlock contact (not shown) which causes one or more of the contactors 50 to open inserting a portion of the resistor 49 in series with the motor 10. The motor 10 thereupon starts to slow down.

When the now more slowly moving arm 36a reaches the contact 10M, the signal voltage at the transformer 86 becomes zero and the relay 95 opens its contacts 95a. The circuit to the windings of the contactors 45 remains completed, however, through the ring 38, the arm 32a, and the segment 40 of the cut-out 32. When the arm 32a reaches the segment 41, a circuit is completed through the contacts 95c and 96c to the winding of the contactor 54 which thereupon closes to reduce the effective value of the resistor 51 causing further slow-down of the motor 10.

When the cut-out arm 32a leaves the segment 40, the last remaining circuit to the windings of the contactors 45 is opened and the contactors 45 drop out to deenergize the motor 10. The motor 10 has previously been slowed down so that it stops assisted by the brake with the arm 32a between the two segments 39 and 40, the arm 26a exactly at the mid-point of the contact 10M, and the rolls 12 spaced exactly nine inches apart.

Opening of the contacts 45a effects deenergization of the relay 64 which thereupon opens its contacts. Opening of the contacts 64c deenergizes the winding 81 and the hub 79 of the selector 69 moves the arms 75 and 76 into engagement with the contacts 2m and 2v, respectively. This operation immediately causes a signal voltage to appear at the transformer 107 equal to the voltage between the contacts 7V and IV. The phase of this voltage is such with respect to the phase of the voltage at the transformer 114 that the tube 113 conducts whereas the tube 112 does not. Conduction of the tube 113 causes energization of the reverse contactor 56 and the set-up motor 30 rotates in the reverse direction to drive the arm 26a counter-clockwise toward the contact 7V and the arm 36a counterclockwise along the contact 10M four-tenths of the distance between adjacent contacts of the rheostat 36. Prior to the arm 26a reaching the contact 7V, the signal voltage at the transformer 107 has decreased to a value permitting conduction of the tube 115 and operation of the contactor 59 which completes the armature shunt connection for the motor 30. It should be noted that, after opening of the contactors 55 or 56, the contactor 59 remains closed completing a dynamic braking circuit for the motor 30.

The apparatus is now set-up for operation of the screw-down motor 10 to position the rolls 12 for the second pass. Upon closure of the push-button 62, the relay 64 operates as before. Since the voltage at the transformer 86 now has a phase relation determined by the voltage drop between the contacts 10M and 7M, the tube 93 instead of the tube 92 is rendered conductive and the relay 96 responds to effect closure of the down-contactors 46 over a circuit through the contacts 96a. The screw-down motor therefore drives the upper roll 12 downwardly until the arm 36a stops exactly at the center of the contact 7M corresponding to 2.6 inches of roll travel and with the rolls exactly 6.4 inches apart. It will be understood that when the arm 36a reached the contact 8M, the reduced value of the signal voltage at the transformer 86 caused operation of the relay 102 to effect closure of the armature shunt contactor 52. Hence the motor 10 was slowed down before the arm 36a reached the contact 7M.

As the operation continues, the selector 69 moves clockwise step-by-step, the set-up motor 30 operates to pre-position the arm 36a in accordance with the rolling schedule determined by the plugged in position of the plug and cord sets 89, and each time the push button 62 is operated the screw-down motor 10 rotates the pre-selected number of revolutions and then stops automatically.

It should be noted from the foregoing description of operation that, if the screw-down motor 10 is called upon to move the arm 36a only between adjacent contacts, the contactor 52 remains closed; and that, if the set-up motor 30 is called upon to move the arm 26a only between contacts having but one contact therebetween or between adjacent contacts, i. e. a vernier adjustment corresponding to pre-positioning movement of 0.2 inch or less, the contactor 59 remains closed. Hence for short movements, the motors 10 and 30 do not attempt to accelerate to their maximum speeds which is desirable.

The phase relationships that determine the direction of operation of the motors 10 and 30 in the foregoing example chosen to explain the operation are believed to be readily apparent, and the following additional explanation is included merely for completeness. When the arms 26a and 76 are in the respective positions shown, the conductor 111 is connected through the resistor 65 from the contact 6V to the left-hand supply conductor 68 (Fig. 2) and the conductor 110 is connected directly to the right-hand supply conductor 68. The tube 112 then conducts and causes the contactor 55 to connect the motor 30 for operation in the forward direction. On the other hand, when the arm 26a is in engagement with the contact 1V and the arm 76 engages the contact 2v, the conductor 111 is connected through the contact 1V to the right-hand supply conductor 68 (Fig. 2) and the conductor 110 is connected through the resistor 65 from the contact 1V to the left-hand supply conductor 68. Consequently, the phase relation of the voltage at the primary of the transformer 107 with respect to the voltage of the source is now 180° different from its former relationship, the tube 113 instead of the tube 112 conducts, the reverse contactor 56 is operated, and the motor 30 runs in the reverse direction. The reversal of phase of the voltage at the transformer 86 caused by movement of the arm 36a from the position shown into engagement with the contact 5M and subsequent movement of the arm 75 into engagement with the contact 2m is traceable in like manner through the conductors 90 and 91.

It will be readily apparent that the illustrated embodiment of the invention can be modified to incorporate the synchronous-tie system of Fig. 3 and the multi-schedule system of Fig. 4 of the prior Wright and Wilcox patent mentioned hereinbefore. It is equally obvious that additional balance anticipatory circuits may be used for either or both of the motors 10 and 30 to introduce additional points of slow-down before final stopping.

While a preferred arrangement of the apparatus and circuits has been disclosed herein, it is understood that it is merely illustrative of the principles of the invention. Although any suitable tubes, resistance values, and voltage values may be used, it has been found advantageous to use No. 2050 thyratrons for the tubes 92, 93, 101, 112, 113, and 115, to relate the ohmic value of the resistors 65 and 66 to the voltage of the source 68 so that a voltage drop of 2.5 volts exists between adjacent contacts 1M through 10M and 1V through 10V, to have the turns ratio of the transformers 86 and 107 be relatively high such as 7 to 1, and to cause a voltage of about 6 volts to appear at the secondaries of the transformers such as the transformers 87 and 108.

The earlier method of sensing the required direction of motor travel as disclosed in the Wright and Wilcox patent made use of a sensitive polarized relay connected across a direct as distinguished from an alternating signal voltage. With a direct voltage across the rheostat, the voltage between adjacent rheostat contacts could not be increased much above 0.5 volt because of the low thermal capacity of available sensitive polarized relays, and consequently the contacts on the stepping relay, the plug and cord sets, and the rheostats had to be maintained in a very clean condition. Further the use of a low impedance sensitive relay as a balance detector does not lend itself to the use of any balance anticipatory control.

I claim:

1. A control system comprising a motor driven rheostat having a plurality of contact segments and a contact arm engageable with said segments in sequence as said rheostat operates, switch means operable to start and stop said rheostat, a tapped resistor having taps connected to said segments, respectively, means producing a signal voltage proportional to the number of said segments between said arm and a pre-selected one of said segments, circuit means responsive to said voltage for rendering said switch means operative to start said rheostat and move said arm toward said pre-selected segment, contactor means operative to control the speed of said rheostat, and said circuit means including a gaseous discharge means responsive to the magnitude of said voltage for rendering said contactor means operative to reduce the speed of said rheostat prior to said arm reaching said pre-selected segment and a separate discharge means for rendering said switch means operative to stop said rheostat when said arm engages said pre-selected segment.

2. The control system of claim 1 characterized in that said switch means is operable to start said motor in opposite directions selectively, in that said signal voltage is alternating, in that means are provided for producing an alternating reference voltage, and in that said separate discharge means is operative in response to the phase relationship between said signal and reference voltages to render said switch means operative to start said motor in a direction determined by said phase relationship.

3. The control system of claim 1 characterized in that said gaseous discharge means becomes so responsive to the magnitude of said signal voltage when said arm engages a pre-determined one of said segments in its path of relative movement toward said pre-selected segment, and in that means are provided for pre-determining the number of segments between said pre-determined segment and said pre-selected segment.

4. A control system comprising a motor driven rheostat arranged for connection to a source of alternating voltage and when so conected operative to produce a voltage of variable phase and magnitude depending upon the direction of unbalance and the degree of unbalance of said rheostat, respectively, a balance detector, means connecting said balance detector to a point on said rheostat to predetermine the degree of unbalance, said balance detector being responsive to the phase of said voltage for causing said rheostat to operate in a predetermined direction to reduce said unbalance and responsive to the magnitude of said voltage to stop said rheostat when it becomes balanced, a balance anticipator connected to said point and subjected to said voltage, said balance anticipator including a relay means and a means responsive to a relatively small change in said voltage to effect a relatively large change in the current in said relay means, and said relay means being responsive to said large change in current to slow down said rheostat prior to its becoming balanced.

5. A control system comprising a motor driven rheostat arranged for connection to a source of alternating voltage and when so connected operative to produce a signal voltage of variable phase and magnitude depending upon the direction of unbalance and degree of unbalance of said rheostat, respectively, a balance detector, means connecting said balance detector to a point on said rheostat to predetermine the degree of unbalance, a source of reference voltage, said balance detector comprising a pair of electronic tubes and associated relay means and being responsive to the phase angle between said signal voltage and said reference voltage for causing said rheostat to operate in a predetermined direction to reduce said unbalance and responsive to the magnitude of said signal voltage to stop said rheostat when it becomes balanced, and a balance anticipator comprising an electronic tube and associated relay responsive only to the magnitude of said signal voltage for slowing down said rheostat prior to its becoming balanced.

6. A motor and control system combination comprising a motor, electromagnetic switch means operative when energized for controlling the direction of rotation of said motor and operative when deenergized to stop said motor, a rheostat having a resistor and a movable arm engaging said resistor and driven by said motor, means for producing an alternating voltage drop across said resistor, means connected to said arm and to a preselected point on said resistor and including means for producing concurrently a voltage in phase with said voltage drop and substantially proportional thereto and a voltage substantially 180° out of phase with respect to said voltage drop and substantially proportional thereto, phase responsive means responsive to said voltages for supplying a substantially constant energizing current to said switch means to cause said motor to operate in a direction to reduce said voltage drop, and said phase responsive means being operative when said voltages reach zero to deenergize said switch means thereby to stop said motor.

7. The combination of claim 6 characterized in that slow-down means operative to slow down said motor while it is rotating is associated with said resistor and movable arm to slow down said motor when said voltage drop decreases below a predetermined value and comprises an electromagnetic relay controlled by a gaseous discharge device having its grid subjected to said voltage drop.

8. The combination of claim 7 characterized in that means are provided to adjustably select said predetermined value.

9. The combination of claim 6 characterized in that said phase responsive means includes a pair of gaseous electronic tubes and means for subjecting the grids of said tubes to said voltages, respectively, produced by said means which is connected to said arm and to a point on said resistor.

10. A motor and control system combination comprising a motor, means for connecting said motor to a source of power for causing operation of said motor, electromagnetic switch means operable to control the speed of said motor, a rheostat having a resistor and a movable arm engaging said resistor and driven by said motor, means for producing a voltage drop across said resistor, voltage responsive means connected between said arm and a point on said resistor toward which said motor is driving said arm, means for selecting said point, and said voltage responsive means including gaseous discharge means responsive to a reduced value of the voltage between said arm and said point as said arm approaches said point for causing a sudden change in the excitation of said switch means thereby rendering said switch means operative to slow down said motor.

11. A motor and control system combination comprising a motor, forward and reverse electromagnetic switch means operable selectively to connect said motor to a source of power for operation of the motor in a forward and a reverse direction, respectively, a rheostat device having a movable contact member driven by said motor in opposite directions selectively, a source of reference voltage, means connectable to points on said rheostat selectively and operative when connected to a selected point to produce a signal voltage of variable phase with respect to said reference voltage and of variable magnitude depending upon the position of said movable contact member, and constant current supply means responsive to the phase relationship of said voltages to supply a substantially constant excitation current to said forward switch means and none to said reverse switch means and to supply a substantially constant excitation current to said reverse switch means and none to said forward switch means, selectively, whereby said motor rotates in a direction dependent upon the phase relationship of said voltages, rotation of said motor causing said contact member to rotate in a direction to reduce said signal voltage to zero while said excitation current remains constant, said circuit means being responsive to said signal voltage reaching zero to render said switch means operative for stopping said motor.

12. The combination of claim 11 characterized in that an electromagnetic contactor means operable to effect slow-down of said motor while it is operating is made responsive to the conductivity of a gaseous discharge device controlled by a unidirectional component of said signal voltage provided by a rectifier and in that said discharge device is responsive to a predetermined reduced value of said unidirectional component for rendering said contactor means operative.

13. A control system for pre-selecting the spacing of the rolls of a rolling mill comprising a screwdown motor for moving the rolls, contactor means operable to connect said motor to a source of power for operation of said motor in opposite directions, selectively, a resistor connected across a first source of alternating voltage and having a plurality of uniformly spaced taps, a contact arm coupled to said motor and movable by said motor into engagement with said taps successively, a transformer having one primary terminal connected to said arm, a selector device connected to the other primary terminal of said transformer and being operative to complete connections from said other primary terminal to selected ones of said taps successively, a secondary winding for said transformer having a center tap thereby providing two voltages 180 degrees out of phase with each other, a pair of grid controlled gaseous discharge devices having their grids connected respectively to terminals of said secondary winding and their cathodes connected to said center tap through a second source of alternating voltage in phase with one of said two secondary voltages and out of phase with the other of said two secondary voltages, selectively, depending upon the tap selected by the selector device, plate circuits for said tubes including means for producing respective plate voltages in phase with said second source of fixed phase, and operating windings for said contactor means in said plate circuits respectively, said tubes being rendered operative selectively to pass current to one or the other of said windings depending upon the phase relation between said two secondary voltages and the voltage produced in said grid-cathode circuit by said second source of alternating voltage.

14. The control system of claim 13 characterized in that a slow down means for said motor is provided which comprises a rectifier connected across said secondary winding, a third gaseous discharge device responsive to the output voltage of said rectifier, and a slow down relay controlled by said third gaseous discharge device and rendered operative thereby to effect slow down of said motor.

15. A control system comprising a motor driven rheostat having a plurality of contact segments and a contact arm engageable with said segments in sequence as said rheostat operates, reversing switch means including a forward switch means and a reverse switch means, said forward switch means being operative when supplied with a forwardly operative excitation current to start said rheostat in the forward direction and operative when the forwardly operative excitation current supplied thereto is reduced substantially to zero to permit stopping of said rheostat, said reverse switch means being operative when supplied with a reversely operative excitation current to start said rheostat in the reverse direction and operative when the reversely operative excitation current supplied thereto is reduced substantially to zero to permit stopping of said rheostat, a tapped resistor having taps connected to said segments, respectively, means producing a signal voltage directly related to the number of said segments between said arm and a pre-selected one of said segments, a first constant current supply means responsive to said signal voltage to supply said forwardly operative excitation current at substantially constant value to said forward switch means while supplying substantially no excitation current to said reverse switch means, to supply said reversely operative excitation current at substantially constant value to said reverse switch means while supplying substantially no excitation current to said forward switch means, and to supply substantially no excitation current to either of said forward and reverse switch means, selectively, depending upon the relative position of said arm and said pre-selected segment, the selective operation of said forward switch means and said reverse switch means causing said rheostat to operate in a direction to move said arm toward said pre-selected segment thereby to reduce said signal voltage while the selected one of said excitation currents remains constant, said first constant current supply means being responsive to the value of said signal voltage when said arm engages said preselected segment to supply no excitation current to either of said forward and reverse switch means, whereby said reversing switch means becomes operative to permit stopping of said rheostat, an electromagnetic speed control means operative to permit said rheostat to run at its maximum speed and to permit said rheostat to run at a slower speed, selectively, depending upon whether an operative excitation current is supplied thereto or substantially no excitation current is supplied thereto, and a second constant current supply means for said speed control means and responsive to said signal voltage to supply said last mentioned operative excitation current at substantially constant value to said speed control means and to supply substantially no excitation current to said speed control means, selectively, depending upon the number of said segments between said arm and said pre-selected one of said segments.

CHARLES ALLAN SCHURR.

REFERENCES CITED

The following references are of record in the file of this patent:

UNITED STATES PATENTS

| Number | Name | Date |
| --- | --- | --- |
| 1,942,587 | Whitman | Jan. 9, 1934 |
| 2,106,965 | Wright et al. | Feb. 1, 1938 |
| 2,154,375 | Chambers | Apr. 11, 1939 |
| 2,266,064 | Muller | Dec. 16, 1941 |
| 2,292,063 | Dome | Aug. 4, 1942 |